United States Patent

[11] 3,612,921

| [72] | Inventor | Dan L. Springate<br>Temple City, Calif. |
|---|---|---|
| [21] | Appl. No. | 811,120 |
| [22] | Filed | Mar. 27, 1969 |
| [45] | Patented | Oct. 12, 1971 |
| [73] | Assignee | Bell & Howell Company<br>Chicago, Ill. |

[54] ANNULAR SHEAR ACCELEROMETER
10 Claims, 4 Drawing Figs.

[52] U.S. Cl. .................................................. 310/8.4,
310/9.1, 310/9.5, 310/9.6
[51] Int. Cl. .................................................. H04r 17/00
[50] Field of Search .................................. 310/8.2–8.6,
9.1–9.4; 340/17; 73/71, 517

[56] References Cited
UNITED STATES PATENTS

| 2,411,401 | 11/1946 | Welch .......................... | 310/8.4 |
| 2,592,703 | 4/1952 | Jaffe ........................... | 310/9.1 X |
| 2,808,524 | 10/1957 | Feinstein ..................... | 310/8.4 |
| 3,104,334 | 9/1963 | Bradley, Jr. et al. .......... | 310/8.4 |
| 3,104,335 | 9/1963 | Shoor ........................... | 310/8.4 |
| 3,307,054 | 2/1967 | Shoor ........................... | 310/8.4 |
| 3,390,286 | 6/1968 | Gradin et al. ................ | 310/8.4 |
| 3,460,061 | 8/1969 | Massa ........................... | 310/8.4 X |

Primary Examiner—Milton O. Hirshfield
Assistant Examiner—Mark O. Budd
Attorney—David Weiss ABSTRACT: A shear accelerometer characterized by its clamping means securing an annular piezoelectric element to both the accelerometer's base and inertial members, thereby avoiding the utilization of interfacial bonding media.

Dan L. Springate,
INVENTOR.
BY.

*David Mier*

ATTORNEY.

3,612,921

Dan L. Springate,
INVENTOR.
BY.
David Mess
ATTORNEY.

ANNULAR SHEAR ACCELEROMETER

BACKGROUND OF THE INVENTION

1. Field of the Invention

This invention relates to accelerometers, and more particularly to accelerometers including a piezoelectric element operable in a shear mode.

2. Description of the Prior Art

Accelerometers which include a piezoelectric element operable in a shear mode (generally called shear accelerometers) are well known to the transducer art. The piezoelectric element is mounted between a base member and an inertial mass member of the accelerometer, such that movement of the two members relative to one another induces a shear mode strains in the element. The base member is adapted to be mounted to a structure so that structure vibrations in the vicinity of the mounting station cause movement of the base member relative to the mass member. The resulting shear mode strains in the piezoelectric element cause electrical charges of opposite sign to be generated at a pair of opposing surfaces of the element, the pair being determinable with respect to the direction of element polarization. Electrodes are positioned on the appropriate surfaces, and the charge generated between the electroded surfaces produces an electrical signal which can be amplified for indicating structure acceleration.

For an annular element having a longitudinal axis, the accelerometer is commonly constructed so that the shear forces are applied to the element parallel to the longitudinal axis. For many piezoelectric materials utilized in accelerometer applications, for example polarizable crystalline materials such as ceramic titanate compositions known to the transducer art, useful piezoelectric effects can be obtained when the direction of polarization is either parallel to the element's longitudinal axis, or radially oriented with respect to the longitudinal axis. Accordingly, for axially polarized annular elements, the electrodes are positioned on the two concentric cylindrical surfaces parallel to the longitudinal axis; for radially polarized annular elements, the electrodes can be positioned on the two planar or flat faces perpendicular to the element's longitudinal axis.

A shear accelerometer employing axial polarization is disclosed in a patent to Bradley et al., U.S. Pat. No. 3,104,334 (issued Sept. 17, 1963). The accelerometer according to Bradley, et al., includes an annular piezoelectric element secured along its inner cylindrical surface to the cylindrical surface of an axial support member attached to the accelerometer base. A cylindrical mass or inertial member is concentrically positioned about the element and is secured to the element's outer cylindrical surface.

In order to assure efficient transmission of forces at the element-support interface and at the element-mass interface, commercially produced shear accelerometers of the prior art have invariably included bonding media at the interfaces. Appropriate bonding media are generally organic in nature, requiring curing treatment after interfacial application, and rendering the accelerometer unsuitable for use in environments where the temperature exceeds the operating range of the bonds.

SUMMARY OF THE INVENTION

In the shear accelerometer of the present invention, an annular piezoelectric element is mechanically secured along its flat faces in the vicinities of their respective inner and outer circumferences, to a base or support member and to an inertial member. Unlike the shear accelerometer disclosed in Bradley, et al., the support and mass members of the shear accelerometer according to the present invention are not secured to the respective inner and outer cylindrical surfaces of the piezoelectric element.

Accordingly, interfacial bonds are not utilized, so that the temperature range of the present shear accelerometer is not limited by the restrictions of available bonding media. In addition, the lack of interfacial bonds and the structural simplicity of the present shear accelerometer permit the realization of substantial economies in both time and costs of fabrication.

According to a preferred embodiment of a shear accelerometer of the present invention, an annular piezoelectric element is provided which includes first and second flat faces perpendicular to the accelerometer's longitudinal axis. Each of these flat faces include respective inner and outer circumferential portions concentric about the axis.

The accelerometer base member includes a pedestal portion concentric about the longitudinal axis, for supporting the annular piezoelectric element along the inner circumferential portion of its "lower" or second face. Means cooperating with the base member and with the inner circumferential portion of the element's "upper" or first face, axially coerces the lower face inner circumferential portion toward the pedestal portion, clamping the piezoelectric element in the vicinity of its inner circumference to the base member.

The acccelerometer's inertial member encircles the piezoelectric element, and includes means clamping the respective outer circumferential portions of the upper and lower flat faces, for axially coercing the outer circumferential portions to rigidly support the inertial member.

In contrast to prior art shear accelerometers where the base and inertial members are secured respectively to inner and outer cylindrical surfaces of the piezoelectric element, the clamp-type securing of the base and inertial members to the element's flat faces, as in the present accelerometer, permits these flat faces to be conveniently utilized as electrode location. The piezoelectric element used in the preferred embodiment is therefore radially polarized with respect to the element's longitudinal axis, and electrode means are conductively coupled to the element's upper and lower flat surfaces and are responsive to electrical charges generated at the flat surfaces in response to produced shear mode strains.

BRIEF DESCRIPTION OF THE DRAWING

The novel features which are believed to be characteristic of the invention, together with further advantages thereof, will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

DETAILED DESCRIPTION OF THE INVENTION

Figure 1:
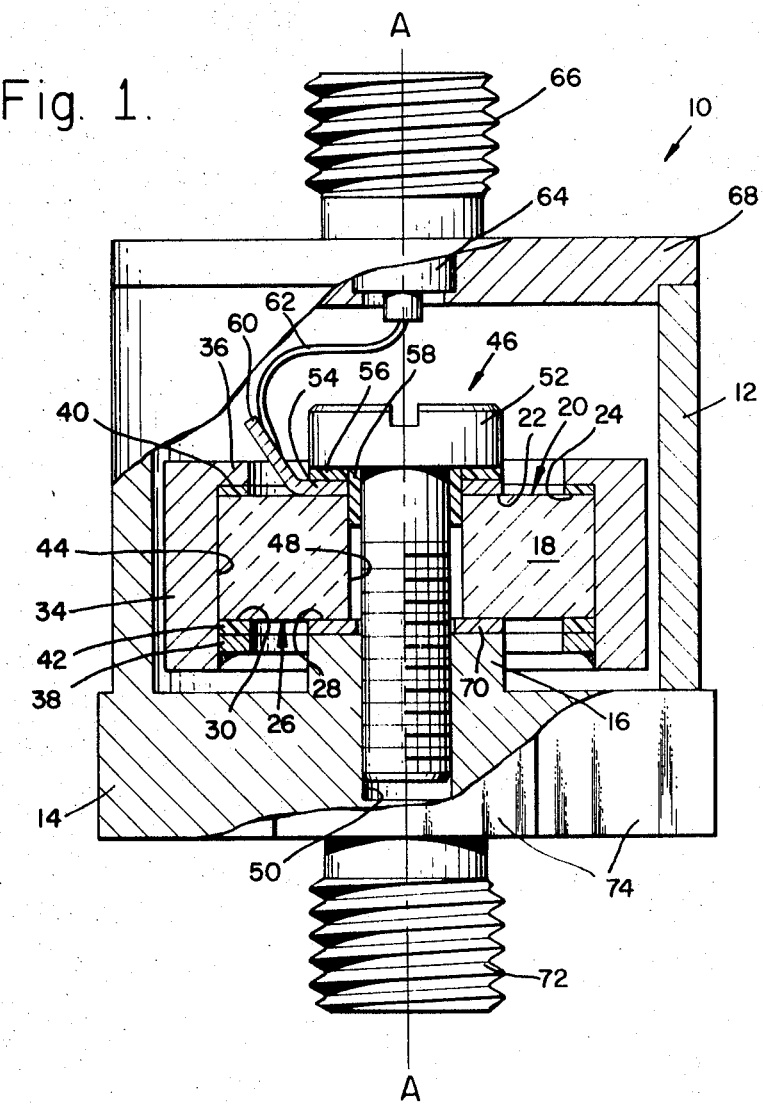
FIG. 1 is a cutaway elevation showing a cross-sectional view of a preferred embodiment of a shear accelerometer according to the present invention.

Turning first to FIG. 1, the preferred embodiment of a shear accelerometer 10, having a longitudinal axis A—A, includes a cylindrical housing member 12 concentric about the axis A—A and integral with a base member 14. The base member 14 includes a cylindrical pedestal portion 16 concentric about the axis A—A, for supporting an annular piezoelectric element 18.

Figure 2:
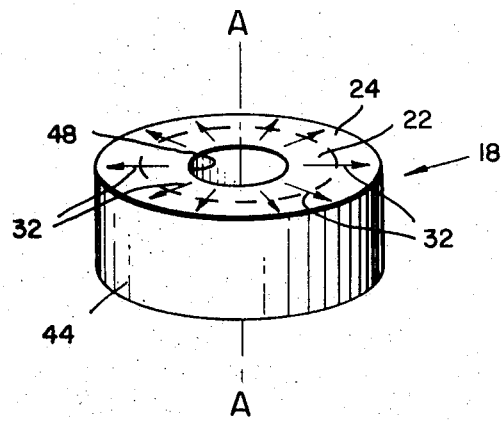
FIG. 2 is a perspective view of the piezoelectric element of the preferred embodiment shown in FIG. 1.

The piezoelectric element 18, better shown in FIG. 2, includes a first flat face 20 comprising an inner circumferential portion 22 and an outer circumferential portion 24 (delineated in phantom in FIG. 2). The element 18 further includes a second flat face 26 comprising an inner circumferential portion 28 and an outer circumferential portion 30 corresponding to the inner and outer circumferential portions 22, 24 of the first flat face 20. Both of the flat faces 20, 26 and their included circumferential portions 22, 24, 28, 30 are perpendicular to and concentric about the longitudinal axis A—A.

The annular piezoelectric element 18 of the preferred shear accelerometer embodiment 10 is radially polarized, as indicated by the arrows 32 in FIG. 2. It is well known that a radially polarized piezoelectric element, when subjected to longitudinal shear stresses, generates electrical charges at the opposing faces perpendicular to the element's longitudinal axis. Accordingly, during operation of the preferred shear accelerometer 10, the generated charges (which are equal but opposite in sign) appear at the first and second flat faces 20, 26. Each of these faces 20, 26 can be coated with a conductive material such as silver (e.g., by suitable deposition techniques), for increasing the electrical conductivity thereof.

An annular mass or inertial member 34 encircles the piezoelectric element 18, and includes an integral collar portion 36 which overlaps the outer circumferential portion 24 of the first flat face 20.

A retainer ring 38 (which is installed after the piezoelectric element 18 is inserted within the inertial member 34) is rigidly secured to the inertial member 34 in such manner that the ring 38 and the collar 36 coerce the two outer circumferential face portions 36, 30 toward one another, i.e., the inertial member 34 is retained by the piezoelectric element 18 by clamping the element 18 along its outer circumferential face portions 30, 36.

The retainer ring 38 can be rigidly secured to the inertial member 34 by any suitable means, and thereupon becomes an integral portion thereof. For example, the retainer ring 38 can be press-fitted within the inertial member 34, and then welded in place, as shown in FIG. 1.

Since charges will be generated on the flat faces 20, 26 during transducer operation, it is desirable that these faces be insulated from one another. Accordingly, a first insulating washer 40 is interposed between the collar 36 and the metallized first face outer circumferential portion 24, and a second insulating washer 42 is interposed between the retainer ring 38 and the metallized second face outer circumferential portion 30. The washers 40, 42 must, of course, transmit the retaining or clamping forces to the element 18, and preferably made of a high temperature-resisting material such as mica. In order to prevent electrical contact between the conductive layers on the faces 20, 26 and the inner cylindrical surface of the inertial member 34, an outer circumferential margin on each face can be left uncoated during the metallizing process. Alternatively, the element's outer cylindrical surface 44 can be electrically insulated from the inertial member 34 by such means as an insulating sleeve or coating thereon.

The piezoelectric element 18 is carried by the base member 14 and rigidly secured to its pedestal portion 16 by a retaining member such as a screw 46 cooperating with the base member 14 and the first face inner circumferential portion 22, for axially coercing the second face inner circumferential portion 28 toward the pedestal 16. The screw 46 fits within the piezoelectric element's inner cylindrical surface 48 and threadably engages a threaded axial hole 50 in the base member 14 and extending through the pedestal portion 16. The screw 46 includes a head portion 52 which overlaps the first face inner circumferential portion 22 and presses thereupon when the screw 46 is tightened into the base hole 50, so that the piezoelectric element 18 is clamped to the base member 14 along the inner circumferential portions 22, 28.

Electrode means are conductively coupled to the first and second flat faces 20, 26. For example, a conductive washer 54 can be interposed between the screwhead 52 and the first face inner circumferential portion 28, in conductive contact with the metallized first face 20 but insulated from the screw 46 by means of a third insulating washer 56. The element's inner cylindrical surface 48 is also insulated with respect to the screw 46, such as by an insulating coating or sleeve 58 on the shank of the screw 46.

The first conductive washer 54 can include an ear or lug 60 to which one end of a conducting wire 62 is welded. The other end of the wire 62 is coupled to a conventional insulated fitting 64 within a conventional coaxial cable connector 66 which is integral with a connector plate 68. The connector plate 68 is rigidly and conductively attached to the housing member 12, in this preferred embodiment, such as by welding.

A second conductive washer 70 can be conductively interposed between the element's second face inner circumferential portion 28 and the base pedestal 16, for providing efficient charge conduction from the element's metallized second flat face 26 to the base member 14, and further serves as a gasket between the second face 26 and the base member 14. It should be noted that the base member 14, the housing member 12, the connector plate 68 and the coaxial cable connector 66 are made of electrically conductive material such as metal, so that the external or threaded portion of the coaxial cable connector 66 and the piezoelectric element's second flat face 26 are at the same electrical potential. In actual use, the connector 66 is generally maintained at common or ground potential.

The shear accelerometer 10 of the present invention is used in a manner and in applications conventional to shear accelerometers of the prior art. In a vibration test situation, for example, the accelerometer 10 is rigidly mounted to a test-piece (not shown), such as by means of a mounting stud 72 which is threadably received by the test-piece (wrench flats 74 being provided for convenience in mounting), with the longitudinal axis A—A positioned parallel to the vibrational direction of interest. The base member 14 (and therefore the inner circumferential portions 22, 28 of the piezoelectric element 18) follow the axial movements of the vibrating test-piece. The inertial member 34 (and therefore the outer circumferential portions 24, 30 of the piezoelectric element 18), of course, reacts to such vibration in accordance with the principles of inertial physics, so that the base member 14 axially moves relative to the inertial member 34.

In a vibrational situation, therefore, equal and opposite axially directed forces are applied to the element's inner circumferential portions 22, 28 and its outer circumferential portions 24, 30, inducing shear mode strains in the piezoelectric element 18.

Accordingly, the difference in the electrical charges generated at the element's flat faces 20, 26 (assuming radial polarization of the piezoelectric element 18), which is the electrical output of the accelerometer 10, is applied to suitable signal amplification and indicator means (not shown) for indicating vibrational reactions of the test-piece.

The various components of the shear accelerometer 10 of the present invention are easily assembled, and significantly, the assembly operations do not include the time consuming preparation and curing of organic bonds. For example, after the piezoelectric element 18 is inserted within the inertial member 34 (along with the first and second insulating washers 40, 42) the retainer ring 38 is installed and becomes an integral part thereof. The element-mass assembly 18, 34 (along with the first conducting washer 54 with wire 62 attached, the second conductive washer 70 and the third insulating washer 56) are positioned on the base pedestal 16, and the screw 46 (including the insulating sleeve 58) is appropriately positioned and secured to the base member 50. After the conductive wire 52 is connected to the connector fitting 64, the connector plate 68 is welded to the housing member 12.

Since bonded interfaces are not utilized in the shear accelerometer 10 of the present invention, higher operational temperatures can be incurred than with the shear accelerometers of the prior art. At the present state of the piezoelectric materials art, the operational temperature of the present accelerometer 10 is limited only by the Curie point of the piezoelectric element utilized.

Figure 3:
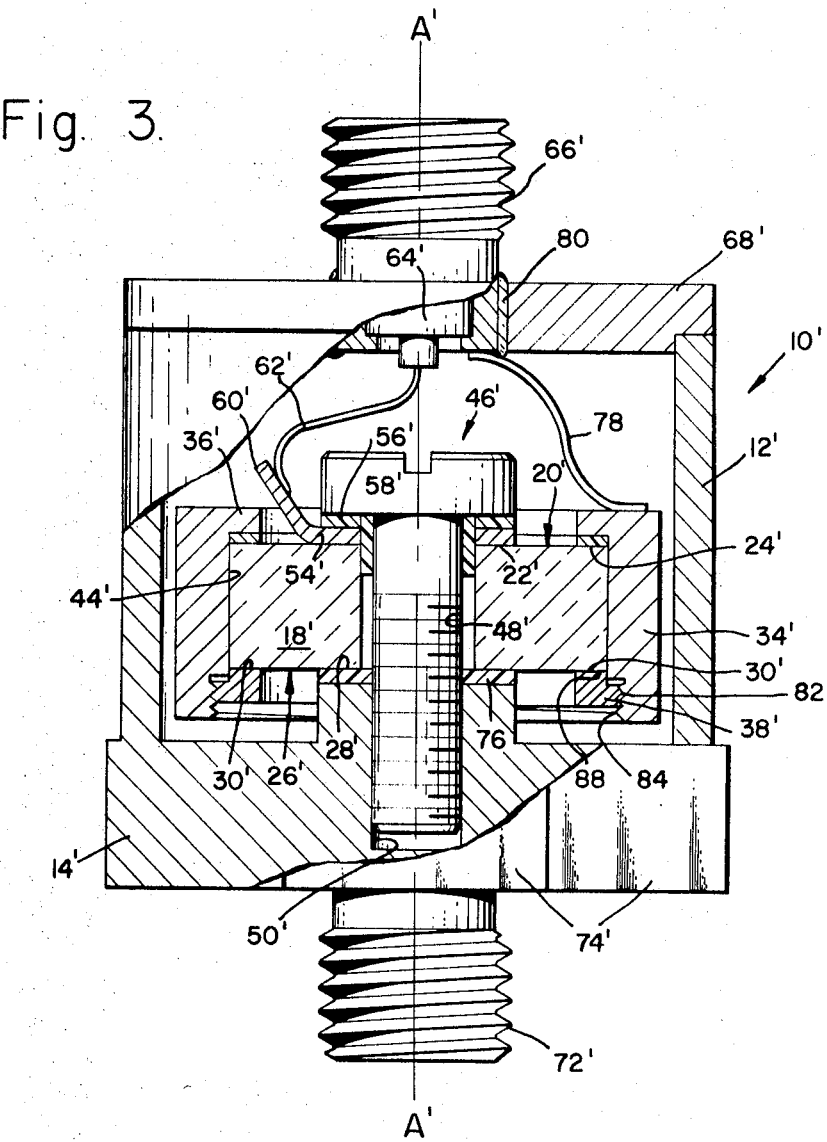
FIG. 3 is a cutaway elevation showing a cross-sectional view of an alternative embodiment of a shear accelerometer according to the present invention.

Turning next to FIG. 3, an alternative embodiment of a shear accelerometer 10' according to the present invention provides electrical case isolation for preventing spurious ground loops during accelerometer use, in addition to the advantages of the preferred embodiment. Primed reference numerals are utilized in FIG. 3, for indicating components corresponding to those of FIG. 1.

In the alternative embodiment 10', the piezoelectric element is electrically isolated from the base member 14', such as by an insulating washer 76 interposed between the base pedestal 16' and the inner circumferential portion 28' of the second flat face 26'. The retainer ring 38', however, is in conductive contact with the outer circumferential portion 30' of the second flat face 26', so that the electrical charge at the second face 26' is transmitted to the inertial member 34' which, in turn, is conductively coupled to the coaxial cable connector 66' by means of a suitably welded second conductive wire 78. The connector 66' is electrically isolated from the connector plate 68', by means of an insulating seal therebetween, such as a glass seal 80.

FIG. 3 further illustrates a second configuration of a retainer ring 38' which is threadably received by the inertial member 34', for causing the collar portion 36' and the ring portion 38' to clamp the outer circumferential portions 24', 30'.

Figure 4:
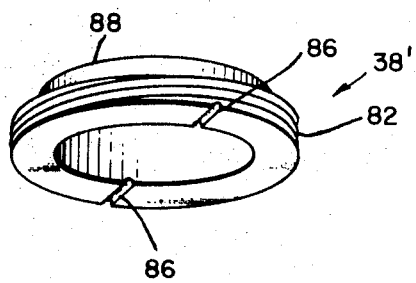
FIG. 4 is a perspective view of the inertial mass retainer ring shown in FIG. 3.

The retainer ring 38', better shown in FIG. 4, includes exterior threads 82 which engage interior threads 84 of the inertial member 34'. After the piezoelectric element 18' is inserted within the inertial member 34', the retainer ring 38' is threaded within the inertial member and tightened (for example by means of screwdriver kerfs 86) until an included boss 88 is pressed against the second face outer circumferential portion 30' with sufficient force to cause the inertial member 34' to be retained by the piezoelectric element 18'. The retainer ring 38' can be tack welded to the inertial member 34', if desired.

The alternative embodiment 10' of the shear accelerometer shown in FIG. 3, is assembled and used in similar manner as already described with respect to the preferred embodiment 10 of FIG. 1.

Thus, there has been shown two embodiments of a shear accelerometer which include all of the advantages inherent in shear accelerometer design, but further include the advantages of simplicity of structure, ease of fabrication and assembly, and lack of bonded interfaces. These added advantages permit the present shear accelerometer to be economically manufactured, and further permit the accelerometer to be utilized in higher temperature environments than were previously possible.

Modifications of the embodiments herein presented may be developed without departing from the essential characteristics thereof. For example, the piezoelectric element can be axially polarized, in which case the electrodes would be modified to pick off the generated charges at the element's inner and outer cylindrical surfaces.

Accordingly, the invention should be limited only by the scope of the claims listed below.

What is claimed is:

1. In a transducer having a longitudinal axis, the combination comprising:
   an annular piezoelectric element having first and second flat faces each including inner and outer circumferential portions perpendicular to and concentric about said axis;
   a first member clamped to said element along said inner circumferential portions; and
   a second member clamped to said element along said outer circumferential portions;
   said members being axially movable relative to one another for producing shear mode strains in said element.

2. The transducer according to claim 1, above, further including electrode means conductively coupled to said element and responsive to electrical charges generated by said element in response to shear mode strains produced therein.

3. In a transducer having a longitudinal axis, the combination comprising:
   an annular piezoelectric element having first and second flat faces each including inner and outer circumferential portions perpendicular to and concentric about said axis;
   a first member;
   clamping means rigidly coupling said inner circumferential portions to said first member;
   a second member;
   clamping means rigidly coupling said outer circumferential portions to said second member;
   said members being axially movable relative to one another for producing shear mode strains in said piezoelectric element.

4. The transducer according to claim 3, above, further including electrode means conductively coupled to said element and responsive to electrical charges generated by said element in response to shear mode strains produced therein.

5. The transducer according to claim 3, above, wherein said element is radially polarized, and further including a first electrode in conductive contact with said first face and a second electrode in conductive contact with said second face.

6. In an accelerometer having a longitudinal axis, the combination comprising:
   an annular piezoelectric element having first and second flat faces each including inner and outer circumferential portions perpendicular to and concentric about said axis;
   a base member having a cylindrical pedestal portion concentric about said axis and supporting said element along said second face inner circumferential portion;
   means cooperating with said base member and said first face inner circumferential portion for axially coercing said second face inner circumferential portion toward said pedestal portion;
   an inertial member encircling said element and clamped thereto along said outer circumferential portions.

7. The accelerometer according to claim 6, above, wherein said element is radially polarized, and further including
   first electrode means on said first flat face, and
   second electrode means on said second flat face.

8. The accelerometer according to claim 6, above, wherein said element is radially polarized, and further including
   first electrode means on said first flat face, and
   second electrode means on said second flat face and conductively communicating with said base member.

9. The accelerometer according to claim 6, above, wherein said element is radially polarized, and further including
   first electrode means on said first flat face, and
   second electrode means on said second flat face and conductively communicating with said inertial member.

10. The accelerometer according to claim 6, above, wherein said inertial member includes
    an annular member encircling said element and having a collar portion overlapping said first face outer circumferential portion, and
    a retainer ring member overlapping said second face outer circumferential portion and rigidly secured to said annular member,
    said collar and ring portions coercing said outer circumferential portions toward one another.